(12) United States Patent
Linhart et al.

(10) Patent No.: US 11,298,637 B2
(45) Date of Patent: Apr. 12, 2022

(54) EXCHANGEABLE FILTER SYSTEM

(71) Applicant: MANN+HUMMEL GmbH, Ludwigsburg (DE)

(72) Inventors: Jochen Linhart, Schwaikheim (DE); Christian Vogt, Marbach (DE)

(73) Assignee: MANN+HUMMEL GmbH, Ludwigsburg (DE)

(*) Notice: Subject to any disclaimer, the term of this patent is extended or adjusted under 35 U.S.C. 154(b) by 206 days.

(21) Appl. No.: 16/677,799

(22) Filed: Nov. 8, 2019

(65) Prior Publication Data
US 2020/0147530 A1 May 14, 2020

(30) Foreign Application Priority Data
Nov. 9, 2018 (DE) .................. 10 2018 128 136.6

(51) Int. Cl.
*B01D 29/96* (2006.01)
*B01D 35/157* (2006.01)
(Continued)

(52) U.S. Cl.
CPC .......... *B01D 29/96* (2013.01); *B01D 35/005* (2013.01); *B01D 35/1573* (2013.01); *F02M 33/00* (2013.01); *B01D 2201/0461* (2013.01); *B01D 2201/16* (2013.01); *B01D 2201/291* (2013.01); *B01D 2201/4092* (2013.01)

(58) Field of Classification Search
CPC .. B01D 29/96; B01D 35/005; B01D 35/1573; B01D 2201/0461; B01D 2201/16; B01D 2201/291; B01D 2201/4092; B01D 27/106; B01D 2201/301; B01D 2201/302; B01D 2201/4023; B01D 27/08; B01D 35/30; B01D 2201/29; B01D 2201/30; B01D 2201/40; B01D 35/153; B01D 35/157; B01D 35/14; F02M 33/00; F02M 37/42;
(Continued)

(56) References Cited

U.S. PATENT DOCUMENTS 4,052,307 A 10/1977 Humbert, Jr.
5,350,506 A 9/1994 Dombek et al.
(Continued)

FOREIGN PATENT DOCUMENTS

DE 202007008483 U1 1/2008
DE 102009014428 A1 * 10/2009 ............ B01D 35/30
(Continued)

*Primary Examiner* — Madeline Gonzalez (57) ABSTRACT

An exchangeable filter system is provided with an exchangeable filter module that has at least one fluid inlet, at least one fluid outlet, and a fluid path connecting the at least one fluid inlet and the at least one fluid outlet with each other. The exchangeable filter module is provided with at least one filter element for filtering a fluid. A flange element and a counter flange element are provided. The flange element is provided to releasably engage the exchangeable filter module and to releasably engage the counter flange element. A valve device is arranged in the flange element. The valve device blocks the fluid path when the flange element is in engagement with the exchangeable filter module and is disengaged from the counter flange element. An internal combustion engine is provided with such an exchangeable filter system to filter fuel, lubricant or urea.

6 Claims, 6 Drawing Sheets

(51) Int. Cl.
*B01D 35/00* (2006.01)
*F02M 33/00* (2006.01)
(58) Field of Classification Search
CPC ............... F01M 2011/031; F01M 1/10; F01M 2001/1085; F01M 11/03
USPC ........ 210/234, 235, 117, 136, 153, 440–444, 210/455, DIG. 17, 450, 493.2
See application file for complete search history.

(56) References Cited

U.S. PATENT DOCUMENTS

| | | |
|---|---|---|
| 5,362,390 A | 11/1994 | Widenhoefer et al. |
| 5,698,093 A | 12/1997 | Pyle et al. |
| 2008/0276999 A1 | 11/2008 | Ohashi |

FOREIGN PATENT DOCUMENTS

| | | |
|---|---|---|
| DE | 102009014428 A1 | 10/2009 |
| DE | 102010005334 A1 | 8/2010 |
| DE | 112014003805 T5 | 6/2016 |
| DE | 102016000157 A1 | 7/2017 |
| EP | 1399235 B1 | 3/2004 |
| GB | 2549825 A | 11/2017 |

* cited by examiner

EXCHANGEABLE FILTER SYSTEM

TECHNICAL FIELD

The invention relates to an exchangeable filter system with a replaceable exchangeable filter module, which comprises at least one fluid inlet and at least one fluid outlet connected by means of a fluid path and at least one filter element for filtering a fluid, and with a flange element that can be brought into releasable engagement with the exchangeable filter module and with a counter flange element, wherein a valve device is arranged in the flange element.

Moreover, the invention relates to an internal combustion engine with such an exchangeable filter system.

BACKGROUND OF THE INVENTION

Such exchangeable filter systems are known. These are exchangeable filter systems that are employed for fluid filtration of viscous fluids. These fluids to be filtered can be stored in a fluid storage that at least partially can house the exchangeable filter system. These viscous fluids can be, for example, oil or fuel. Likewise, also gases can be filtered however in such exchangeable filter systems. A field of use of such exchangeable filter systems are internal combustion engines.

The exchangeable filter module can be formed in particular as an exchangeable filter cartridge. An exchangeable filter module in the meaning of the present disclosure is an exchangeable filter cartridge that cannot be opened without being destroyed. It comprises a housing, in particular of metal or plastic. The housing comprises preferably a cover section in which the fluid inlet, the fluid outlet, and a sealing seat arranged on the cover section can be arranged. The fluid outlet can then be preferably provided centrally in a first cover section; the sealing seat can be arranged preferably concentrically to the fluid outlet on a second cover section, and the fluid inlet, arranged in the housing, preferably in particular in the second cover section, is located preferably between the fluid outlet and the sealing seat. The fluid outlet comprises preferably a thread with which it is releasably connectable to the flange element.

For filtration purposes, the fluid to be filtered (raw fluid) enters the housing of the exchangeable filter module via the fluid inlet. In this housing, at least one filter element is provided, in particular an annular filter element. This filter element serves for filtration of the fluid that flows through the housing of the exchangeable filter module. The filtered fluid (clean fluid) exits after its filtration via the fluid outlet from the housing of the exchangeable filter module. It can then be guided to its further use. In order for the fluid to be able to pass from the fluid inlet to the fluid outlet, the fluid inlet and the fluid outlet are connected by means of a fluid path through which the fluid can flow. The flow of the fluid via the fluid path can be controlled by means of the valve device that is arranged in the flange element.

In such exchangeable filter systems, the exchangeable filter module is mounted at the flange element; the flange element is mounted at the counter flange element. The flange element can be embodied here as a separate component while the counter flange element is typically embodied as part of an external structure, for example, as a corresponding component in an internal combustion engine.

Then, in such an exchangeable filter system, in its operating state, the exchangeable filter module and the flange element are engaged; the flange element, in turn, is in engagement with the counter flange element. However, the exchangeable filter module, due to loading of the filter element and aging effects (of the components and of the fluid, for example, of an oil) and wear, must be exchanged from time to time. In this way, an efficient and reliable filtration of the fluid can be ensured even for an extended period of time. In the course of this required exchanging or servicing process, the old exchangeable filter module must be exchanged for a new exchangeable filter module. In this context, there will be however fluid that still must be filtered or already filtered fluid contained in the exchangeable filter module or in the fluid outlet and the fluid inlet (as well as generally in the fluid path). Upon exchange of the exchangeable filter module, this fluid will escape in an uncontrolled fashion into the environment of the exchangeable filter system. This may cause contamination of the environment of the exchangeable filter arrangement or system. Also, the person which carries out the exchange, i.e., the technician, may come into contact with the (possibly health-hazardous) fluid. This uncontrolled leakage of fluid is therefore to be avoided if possible.

On the other hand, for a simple and fast exchange as well as a simple demounting and mounting of the exchangeable filter module, the number of employed components to be exchanged should be as minimal as possible.

In the prior art, various exchangeable filter systems are known.

DE 20 2007 008 483 U1 concerns a functional element for actuation of a valve. The functional element is comprised of an annular flange region which is glued or welded by means of a fastening surface to the end disc of a filter element and is located in a cup-shaped housing. This housing can be brought into engagement with a filter head in which a slide valve is arranged in a clean liquid channel that closes off the latter when the filter element is unscrewed from the filter head.

DE 10 2009 014 428 A1 concerns an exchangeable liquid filter with closure device. The liquid filter comprises in the region of a filter connecting bottom a liquid inlet, a liquid outlet, and a slidable valve body. The actuation of the valve body is realized by means of a control device that is configured in such a way for interaction with a corresponding counter member of a connecting head that the valve body is opened upon its attachment and is closed upon its removal.

DE 10 2016 000 157 A1 concerns a filter system, closure element, and filter element. The filter system comprises at the housing a closure element that, when a filter element is inserted, releases a clean-side fluid outlet and, when the filter element is removed, blocks the clean-side fluid outlet. For this purpose, the filter element comprises an actuating element for the closure element that comprises a substantially cylindrical valve body.

GB 2 549 825 A concerns a quick-change oil filter. The quick-change oil filter comprises an engine adapter on an internal combustion engine with an oil inlet passage, an oil outlet passage, and a filter base mounting cavity. A filter base is positionable in the filter base mounting cavity and fastened to a filter container with a filter element. A filter support extends from the filter base into the filter container and supports the filter element. The filter support comprises a support tube which extends into the filter element. A check valve is provided for opening in response to the oil pressure in the filter container and is pretensioned in order to close an oil outlet opening in the filter base between the support tube and the oil outlet passage.

DE 11 2014 003 805 T5 concerns a no filter-no operation fluid filter with integration of a low pressure fluid system. The fluid filter comprises a filter medium with a side for filtered fluid and a side for unfiltered fluid, a first end plate, and a second end plate, and a bypass seal. The filter medium is arranged between the first end plate and the second end plate, wherein the fluid filter is configured for engagement with a filter head. The filter head comprises a bypass flow outlet and the bypass seal is configured to block the fluid flow to the bypass flow outlet when the fluid filter is engaged with the filter head.

US 2008/0276999 A1 concerns of fluid filter and a drain valve body therefor. The drain valve body is provided in a fluid filter which comprises a filter element and a tubular body which supports the filter element. Moreover, it comprises a cap and a base which accommodate the filter element and the tubular body and can be screwed together. A drain cap is detachably connected to the cap and closes off a drain hole which is formed in the cap. In this context, the drain valve body comprises a valve section which closes off the drain hole in an openable manner and a pretensioning section which extends from the valve section and pretensions the valve section in a closing direction of the drain hole.

SUMMARY OF THE INVENTION

The invention has therefore the object to provide an exchangeable filter system in which the exchangeable filter module can be exchanged in a simple and fast way without uncontrolled leakage of fluid.

This object is solved by an exchangeable filter system of the aforementioned kind, wherein the valve device blocks the fluid path when the flange element is in engagement with the exchangeable filter module and is disengaged from the counter flange element.

The valve device is arranged in the flange element. This valve device blocks the fluid path from the fluid inlet to the fluid outlet as soon as the flange element engages the exchangeable filter module and is disengaged from the counter flange element. In other words, flow of the fluid via the fluid path is no longer possible in this state.

In the operating state of the exchangeable filter system, the exchangeable filter module engages the flange element; the flange element, in turn, engages the counter flange element. In this context, the counter flange element can be arranged at an external structure such as an internal combustion engine. When exchanging the exchangeable filter module of the exchangeable filter system according to the invention, the flange element is now disengaged from the counter flange element. At the same time, however, the engagement between the flange element and the exchangeable filter module is initially maintained. The system of exchangeable filter module and flange element is disengaged from the counter flange element. In this state, the valve arrangement blocks the fluid path. Leakage of fluid is avoided. Escape of fluid from the fluid outlet is correspondingly prevented. In a second step, the flange element can then be disengaged from the exchangeable filter module. In this context, the valve device will then at least partially open the fluid path again. This will be carried out in a controlled environment in which fluid that may still be contained in the exchangeable filter module can be drained in a controlled fashion and disposed of. The old exchangeable filter module can be exchanged for a new exchangeable filter module which can be brought into engagement with the same (old) flange element. The flange element can thus be reused. An exchangeable filter system is provided that can be exchanged quickly and comfortably.

The exchangeable filter system can be embodied as an oil module in an internal combustion engine. In this way, the accordingly configured complete system together with a corresponding oil container can be exchanged quickly at the interface between flange element and counter flange element and subjected to servicing.

Further embodiments of the invention are disclosed in the respective dependent claims.

In this context, it is advantageous that the exchangeable filter system comprises a pretensioning device with a pretensioning element and a counter pretensioning element which interacts with the valve device, wherein the pretensioning element is in engagement with the counter pretensioning element when the exchangeable filter module is in engagement with the flange element. The pretensioning element and the counter pretensioning element can be arranged advantageously at exchangeable filter module and flange element. Thus, the pretensioning element can be arranged at the exchangeable filter module; the counter pretensioning element can be arranged at the flange element. However, the reverse arrangement—the pretensioning element is arranged at the flange element, the counter pretensioning element is arranged at the exchangeable filter module—is also possible.

The pretensioning element interacts with the counter pretensioning element. In the state in which the flange element is engaged with the exchangeable filter module, the pretensioning element is also engaged with the counter pretensioning element. In reverse, the pretensioning element is disengaged from the counter pretensioning element when the flange element is also disengaged from the exchangeable filter module. This synchronized engagement of the different elements makes it possible that the pretensioning device can interact with the valve device in such a way that it causes the latter to block the fluid path when the flange element is in engagement with the exchangeable filter module and is disengaged from the counter flange element. The pretensioning element as well as the counter pretensioning element can be directly installed during manufacture of the exchangeable filter system or of the exchangeable filter module. A simple apparatus realization of the afore described functionality of the exchangeable filter system is provided.

In this context, it is preferred that the valve device comprises a valve element that, when the pretensioning element is engaging the counter pretensioning element, by means of a spring element is pretensioned against a valve seat, wherein the counter pretensioning element is attached to the spring element.

Blocking of the fluid path by the valve device in a state in which the flange element is disengaged from the counter flange element and is in engagement with the exchangeable filter module can be realized in a simple manner in this way. For this purpose, the valve device comprises a valve element. This valve element interacts with a valve seat. In the state in which the flange element is disengaged from the counter flange element but in engagement with the exchangeable filter module, the valve element is pushed against the valve seat or is in fluid-tight contact therewith. This is effected by means of the spring element that exerts a spring force in such a way on the valve element that the valve element is pretensioned in the direction toward the valve seat. The valve element prevents in this way leakage of the fluid out of the exchangeable filter system in a state in which the flange element is disengaged from the counter flange element but is in engagement with the exchangeable filter module. The exchangeable filter module can be exchanged in a clean way, i.e., without uncontrolled leakage of fluid.

In this context it is particularly advantageous that the counter pretensioning element is attached to the spring element. In this way, two effects are achieved. On the one hand, the engagement of the pretensioning element with the counter pretensioning element causes pretensioning element and counter pretensioning element to be able to interact in such a way that their engagement loads the spring element with a force which is converted into a spring force which moves the valve element into fluid-tight contact at the valve seat. Thus, the engagement of pretensioning element and counter pretensioning element effects the pretensioning of the spring element and thus of the valve element against the valve seat—in the state in which the flange element and the exchangeable filter module are in engagement. The pretensioning device pretensions the spring element. On the other hand, fastening of the counter pretensioning element at the spring element serves for captively securing the counter pretensioning element. In the state in which the flange element is not engaged with the exchangeable filter module, the counter pretensioning element cannot be lost from the flange element.

It is also advantageous that the pretensioning element is embodied as one piece together with a central tube of the filter element, with an end disc of the filter element, with a threaded cover of the exchangeable filter module or with a seal holding ring of the exchangeable filter module or is attached to the central tube, to the end disc, to the threaded cover or to the seal holding ring.

Preferably, the pretensioning element can be embodied as one piece together with the central tube. It can also be preferably embodied as one piece together with the end disc of the filter element. Preferably, it can be embodied together with the threaded cover of the exchangeable filter module. It can also be preferably embodied together with the seal holding ring of the exchangeable filter module. No additional component for the pretensioning element must be provided. Eliminating such an additional component simplifies, on the one hand, the manufacture of the exchangeable filter system. On the other hand, the exchangeable filter system or the exchangeable filter module as a whole can be exchanged without certain components having to be separately manipulated or stored or exchanged.

Alternatively, the pretensioning element can be attached preferably to the central tube. Preferably, it can be attached to the end disc. Preferably, it can be attached to the threaded cover. Also, it can be preferably attached to the seal holding ring.

Thus, an exchangeable filter system is provided in which the exchangeable filter module together with the pretensioning element can be exchanged during servicing.

Furthermore, it is advantageous that the pretensioning element comprises, in an axial direction of the exchangeable filter module, an axial projection that, when the pretensioning element is in engagement with the counter pretensioning element, is in engagement with an annular centering counter contour correspondingly embodied at the counter pretensioning element.

Now, when bringing into engagement the exchangeable filter module with the flange element, the following happens. Exchangeable filter module and flange element are brought to spatially approach each other for engagement. Then, the axial projection of the pretensioning element is brought into engagement with the centering counter contour of the counter pretensioning element. The further movement for approaching exchangeable filter module and flange element is guided by the engagement of axial projection and centering counter contour. This is thus enabled for the technician in a controlled and a simple way. After overcoming a certain distance in the approach, an axial end of the axial projection will contact a bottom of the centering counter contour. Now, upon still further spatial approach of exchangeable filter module and flange element, the pretensioning element will move the counter pretensioning element against the spring force of the spring element in an axial direction away from the exchangeable filter module across the distance of a first stroke. After completing this first stroke, the flange element then will contact the exchangeable filter module. The exchangeable filter module and the flange element must now be safely engaged with each other. This can be done by screwing or pushing the exchangeable filter module onto the flange element. During the course of this engaging action, the spring element is then compressed farther in the axial direction away from the exchangeable filter module across the distance of a second stroke. This second stroke ends when the exchangeable filter module completely engages the flange element.

In this context, it is again advantageous that the counter flange element comprises an actuating element that, when the flange element is in engagement with the counter flange element, interacts in such a way with the valve device that it exerts a force on the latter that is greater than a pretensioning force of the pretensioning device.

Following the afore described second stroke, the actuating element loads the valve element with a force that is greater than the spring force of the spring element with which it is pretensioned against the valve element. The force that is exerted by the actuating element is oriented opposite to that of the spring element. In this way, the valve element will again lift off the valve seat by a certain stroke. The fluid path is partially opened again. In other words, the spring element must still permit a sufficient stroke in its pretensioned state so that the valve device can open the fluid path (partially) upon engagement of flange element and counter flange element.

In this way, it is ensured that the exchangeable filter system in an operating position (mounted on the counter flange element) can be operated reliably. The fluid in the mounted state of the exchangeable filter system can pass unhindered along the fluid path from the fluid inlet to the fluid outlet. When the flange element upon exchange of the exchangeable filter system is disengaged from the counter flange element, the valve device will close the fluid path successively. The fluid path is completely closed as soon as the flange element is disengaged from the counter flange element and the flange element is still in engagement with the exchangeable filter module. Leakage of fluid is avoided.

Furthermore, it is advantageous in this context that the pretensioning element, the counter pretensioning element, and the actuating element are arranged in the fluid path on its side which is facing the fluid outlet, wherein the pretensioning element, the counter pretensioning element, and the actuating element leave the fluid path open at least partially.

On the one hand, a space-saving configuration and attachment of pretensioning element, counter pretensioning element, and actuating element is possible in this way. On the other hand, these components will also be embodied in a flow-optimized way. This means that flow about pretensioning element, counter pretensioning element, and actuating element is possible with pressure losses as minimal as possible.

Finally, the object according to the invention is solved also by an internal combustion engine with an exchangeable filter system as described, wherein the fluid to be filtered is fuel and/or lubricant or urea for the internal combustion engine.

Such an internal combustion engine can be used in many fields: For example, it can be an internal combustion engine in a passenger car, truck, lawnmower, all-terrain vehicle (ATV), a motor chainsaw or stationary/non-stationary generators for power generation. The exchangeable filter system can advantageously be embodied as an oil module at which an oil container is arranged. In this way, the exchangeable filter system according to the invention provides for a simple and fast service when exchanging the exchangeable filter module or the complete system of oil container and oil module.

BRIEF DESCRIPTION OF THE DRAWINGS

Further advantages result from the following drawing description. In the drawings, embodiments of the invention are illustrated. The drawings, description, and claims contain numerous features in combination. A person of skill in the art will consider the features expediently also individually and combine them to expedient further combinations.

DESCRIPTION OF PREFERRED EMBODIMENTS

The Figures show only examples and are not to be understood as limiting.

Figure 1:
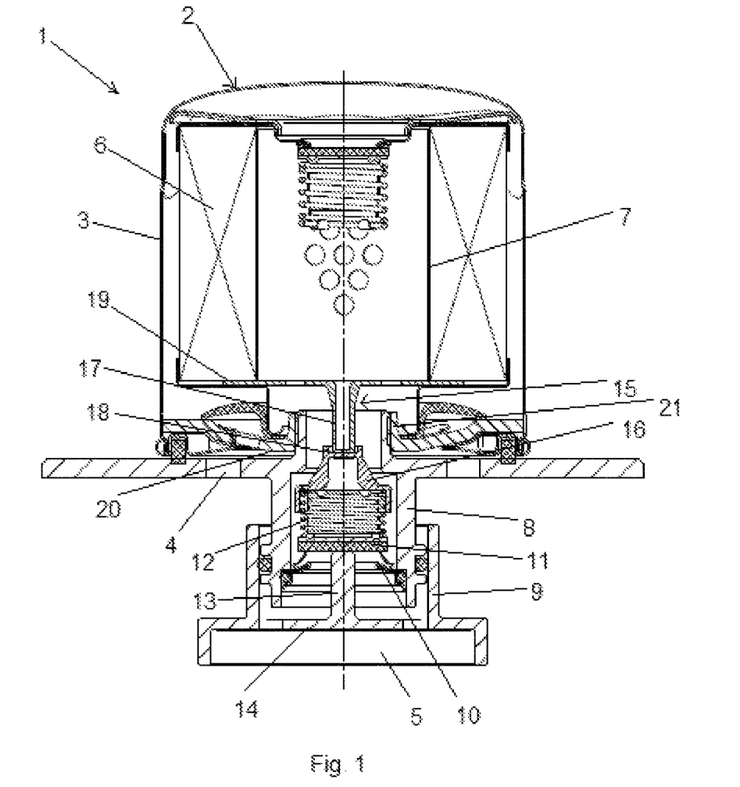
FIG. 1 shows an exchangeable filter system according to the invention in which an exchangeable filter module is in engagement with a flange element that is in engagement with a counter flange element.

FIG. 1 shows an exchangeable filter system 1. The exchangeable filter system 1 can be arranged at least partially in a fluid storage (not illustrated) in which a fluid to be filtered is stored. The exchangeable filter system 1 comprises an exchangeable filter module 2 that comprises a housing 3. The exchangeable filter module 2 comprises a fluid inlet 4 and a fluid outlet 5. The fluid inlet 4 and fluid outlet 5 are connected to each other by a fluid path. The fluid path leads through a hollow interior of the filter element 6. The filter element 6 is attached to a central tube 7.

The exchangeable filter system 1 comprises moreover a flange element 8. The flange element 8 is illustrated in engagement with a counter flange element 9. A valve device 10, 11, 12 is arranged In the flange element 8. This valve device 10, 11, 12 comprises a valve seat 10 and a valve element 11. The valve element 11 is pretensioned by means of a spring element 12 in the direction toward the valve seat 10. It is embodied to be flow-optimized. The valve device 10, 11, 12, comprised of the valve seat 10, the valve element 11, and the spring element 12, is arranged in the flange element 8 and at the same time in the fluid outlet 5.

In the fluid outlet 5, there is furthermore an actuating element 13. This actuating element 13 is attached, on the one hand, by means of a fastening element 14 to the counter flange element 9. It partially leaves open the fluid path in this context. The fluid can pass the fastening element 14.

On the other hand, it can also be seen that the actuating element 13 is contacting the valve element 11. In this context, the actuating element 13 pushes the valve element 11 against the spring force of the spring element 12 away from the valve seat 10 in an axial direction of the exchangeable filter module 2 toward the exchangeable filter module 2. The valve device 10, 11, 12 is open. The fluid path out of the exchangeable filter module 2 is open.

Figure 2:
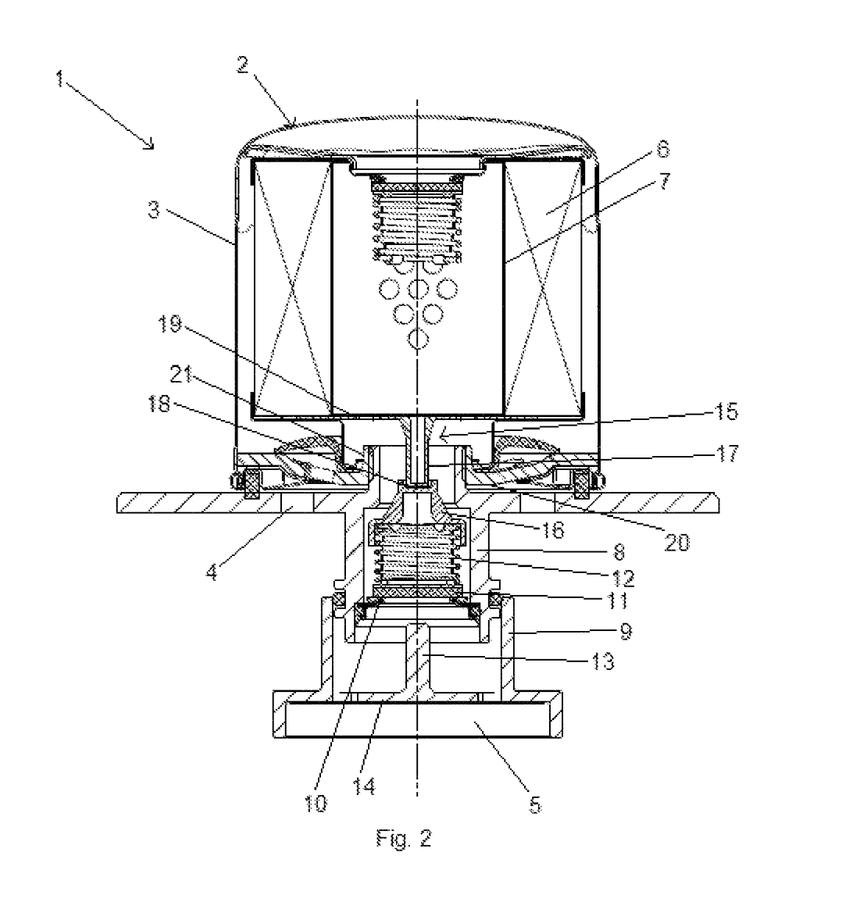
FIG. 2 shows he exchangeable filter system of FIG. 1 according to the invention in which the flange element is disengaged from the counter flange element.

In the illustrated embodiment, the flange element 8 is in engagement with the counter flange element 9. This engagement can be produced, for example, by a screw connection or plug-in connection between the flange element 8 and the counter flange element 9. The engagement is thus releasable. When releasing the engagement, the following will happen:

When being disengaged from the counter flange element 9, the flange element 8 is moved away from the counter flange element 9 in the axial direction of the exchangeable filter module 2. This is illustrated in FIG. 2. During this process, the actuating element 13 remains first in contact with the valve element 11. However, the father the flange element 8 moves away upon disengagement from the counter flange element 9 from the latter, the smaller the section of the actuating element 13 still in overlap with the valve seat 10 becomes. The valve element 11 is thus again lowered, caused by the spring force of the spring element 12, in the direction of the valve seat 10. This happens to the degree at which the flange element 8 moves away from the counter flange element 9. During the course of this movement, finally the point is reached at which the actuating element 13 has no overlap anymore with the valve seat 10. Now the contact of the actuating element 13 at the valve element 11 ends. The spring element 12 now pushes the valve element 11 against the valve seat 10. The valve device 10, 11, 12 is closed. The fluid path is blocked. A leakage of fluid out of the fluid outlet 5 in which the valve device 10, 11, 12 is arranged is interrupted.

This process is reversed upon engagement of the flange element 8 with the counter flange element 9. The actuating element 13 in this context is brought into contact with the valve element 11. The father the engagement of flange element 8 and counter flange element 9 advances in the direction toward an end position, the more the actuating element 13 lifts the valve element 11 out of its contact with the valve seat 10 against the spring force of the spring element 12. The valve device 10, 11, 12 is open. The fluid can flow along the fluid path unhindered through the exchangeable filter system 1.

In the illustrated embodiment of FIG. 2, the flange element 8 is indeed disengaged from the counter flange element 9. However, the flange element 8 in the illustrated embodiment is still in engagement with the exchangeable filter module 2. This engagement can be produced by a screw connection or a plug-in connection. The engagement is thus releasable.

In this state of FIG. 2, the valve device 10, 11, 12 blocks the fluid path. This blockage of the fluid path—as described—is achieved by means of the pretension of the spring element 12 of the valve device 10, 11, 12 against the valve seat 10. This pretension is generated by means of a pretensioning device 15, 16. This pretensioning device 15, 16 comprises a pretensioning element 15 and a counter pretensioning element 16. In this context, the counter pretensioning element 16 is attached to the spring element 12. The pretensioning element 15 and the counter pretensioning element 16 are illustrated in engagement with each other. In this context, an axial projection 17 is formed on the pretensioning element 15 which is in engagement with a centering counter contour 18 of the counter pretensioning element 16. In this way, the pretensioning element 15 loads with a force the counter pretensioning element 16 in the axial direction of the exchangeable filter module 2 in the direction toward the valve seat 10. The counter pretensioning element 16, on the other hand, is connected to the spring element 12. In this way, the pretensioning force of the spring element 12 against the valve seat 10 is generated by means of the force which is exerted by the counter pretensioning element 16.

Figure 3:
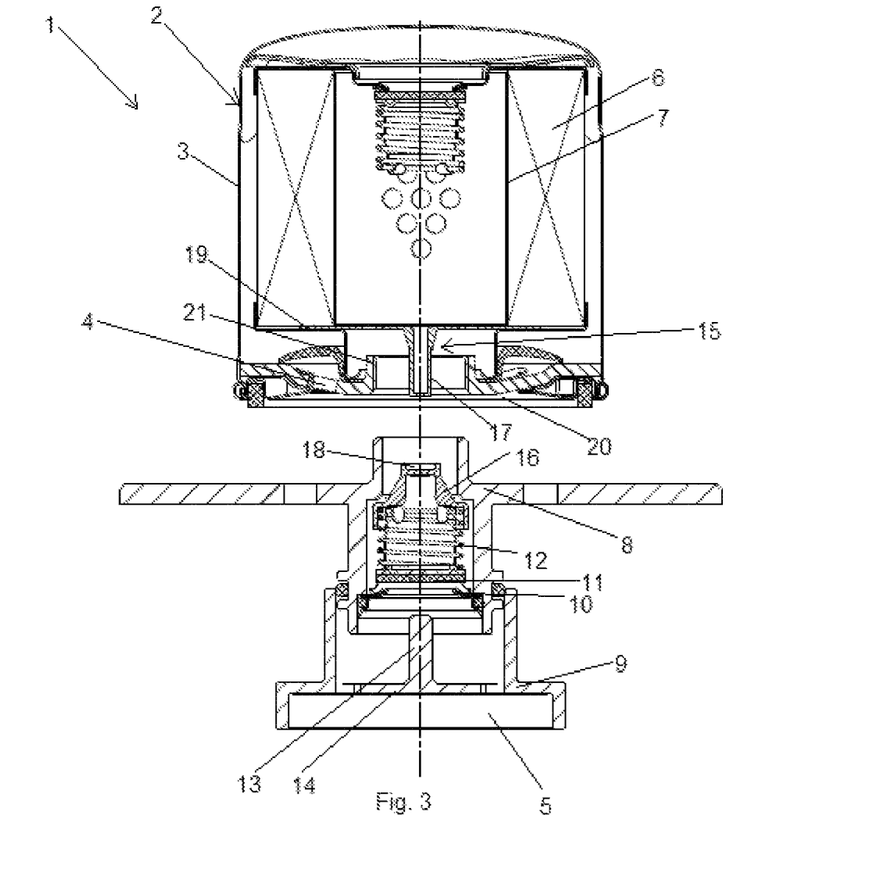
FIG. 3 shows the exchangeable filter system according to the invention of FIG. 2 in which the flange element is disengaged from the exchangeable filter module.

The engagement between the flange element 8 and the exchangeable filter module 2 is releasable. Upon release of the engagement, the following happens. When disengaging from the flange element 8, the exchangeable filter module 2 is moved away from the flange element 8 in the axial direction of the exchangeable filter module 2. This is illustrated in FIG. 3. The pretensioning element 15 remains during this process initially in contact with the counter pretensioning element 16. However, the farther the exchangeable filter module 2 moves away during disengagement from the flange element 8 from the latter, the more the counter pretensioning element 16 moves in the axial direction of the exchangeable filter module 2 toward the latter. This displacement is caused by the spring force of the spring element 12. This process is continued until the screw connection or plug-in connection between the exchangeable filter module 2 and the flange element 8 is disengaged. At this point in time, the spring element 12 has carried out a second stroke. However, at this point in time the pretensioning element 15 is still in engagement with the counter pretensioning element 16. Only upon further movement of the exchangeable filter module 2 (and thus of the pretensioning element 15) away from the flange element 8 (and thus from the counter pretensioning element 16), the pretensioning element 15 is no longer in contact with the counter pretensioning element 16 after overcoming a first stroke. Now, the valve device 10, 11, 12 no longer blocks the fluid path. Fluid which is still contained in the exchangeable filter module 2 can now flow out of the latter.

This process is reversed when the flange element 8 engages the exchangeable filter module 2. The pretensioning element 15 is brought thereby into contact with the counter pretensioning element 16. Upon approach of the two elements, the counter pretensioning element 15 compresses the spring element 12 across a first stroke. Then, the exchangeable filter module 2 contacts the flange element 8 and a screw, plug-in or a combined screw/plug-in connection of the two elements is produced. During the course of this connecting action, the spring element 12 is then compressed by means of the counter pretensioning element 16 across a second stroke.

The spring element 12 must still enable a sufficient stroke in its pretensioned state so that the valve device 10, 11, 12 can still (partially) open the fluid path upon engagement of flange element 8 and counter flange element 9. It is possible to provide in different embodiments of the invention different configurations for the attachment of the pretensioning element 15. These different embodiments are illustrated in FIGS. 4 to 6.

In the embodiment of FIGS. 1 to 3 it is shown that the pretensioning element 15 is embodied as one piece together with an end disc 19 of the filter element 6. As an alternative, it is possible to attached the pretensioning element 15 to the end disc 19.

Figure 4:
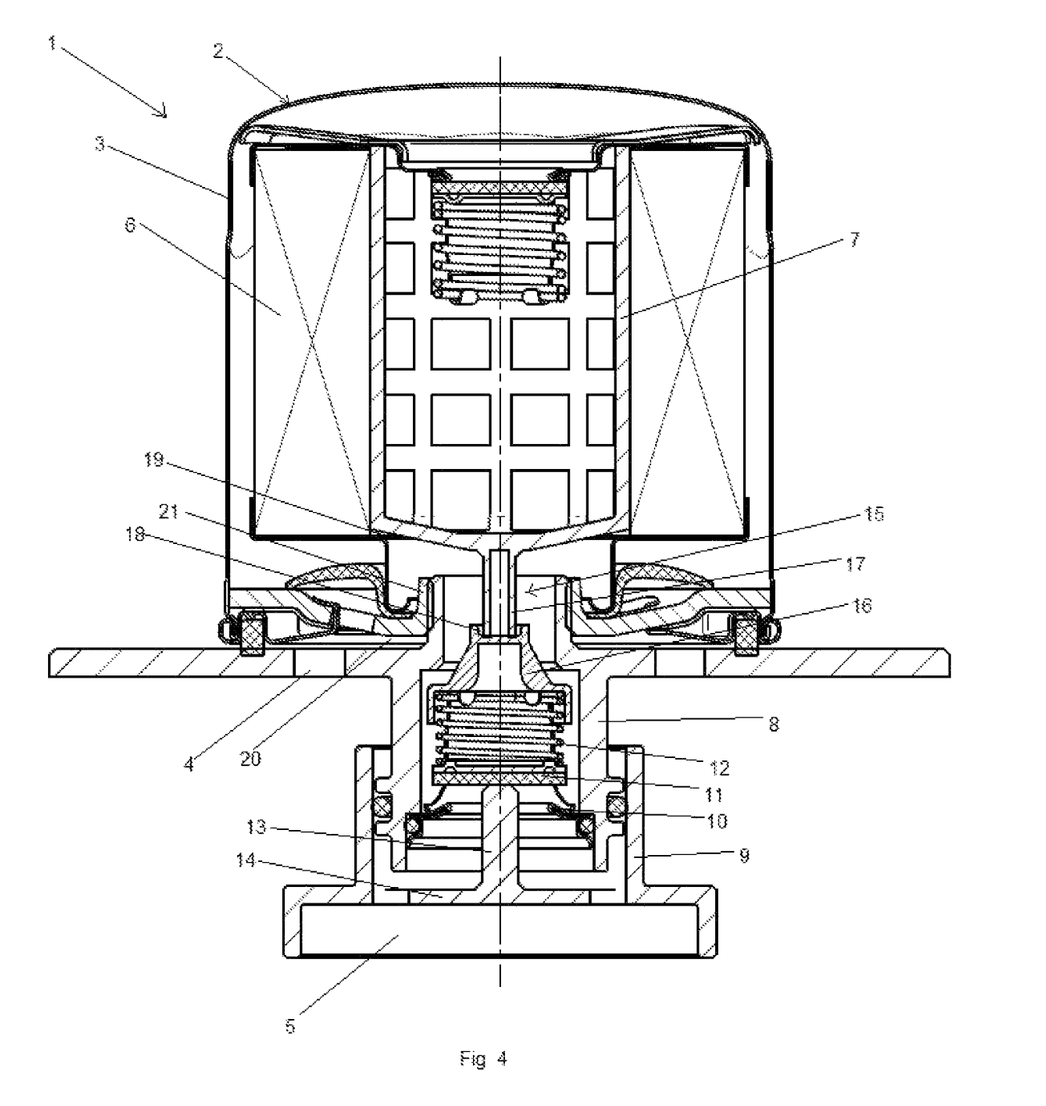
FIG. 4 is a further embodiment of the exchangeable filter system according to the invention.

Then, it is initially shown in FIG. 4 that the pretensioning element 15 can also be embodied as one piece together with the central tube 7 of the exchangeable filter module 2. It can also be alternatively provided that the pretensioning element 15 is attached to the central tube 7.

Figure 5:
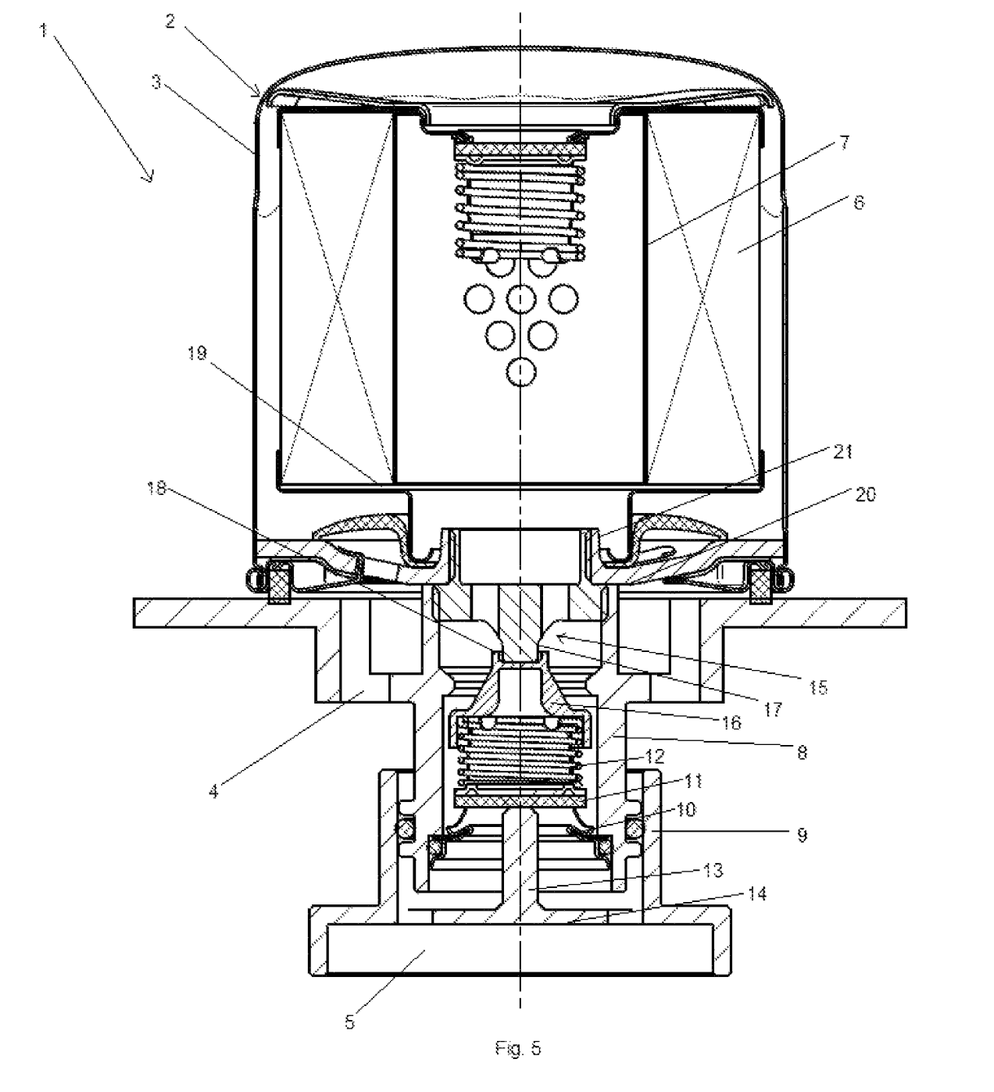
FIG. 5 shows yet another embodiment of the exchangeable filter system according to the invention.
Figure 6:
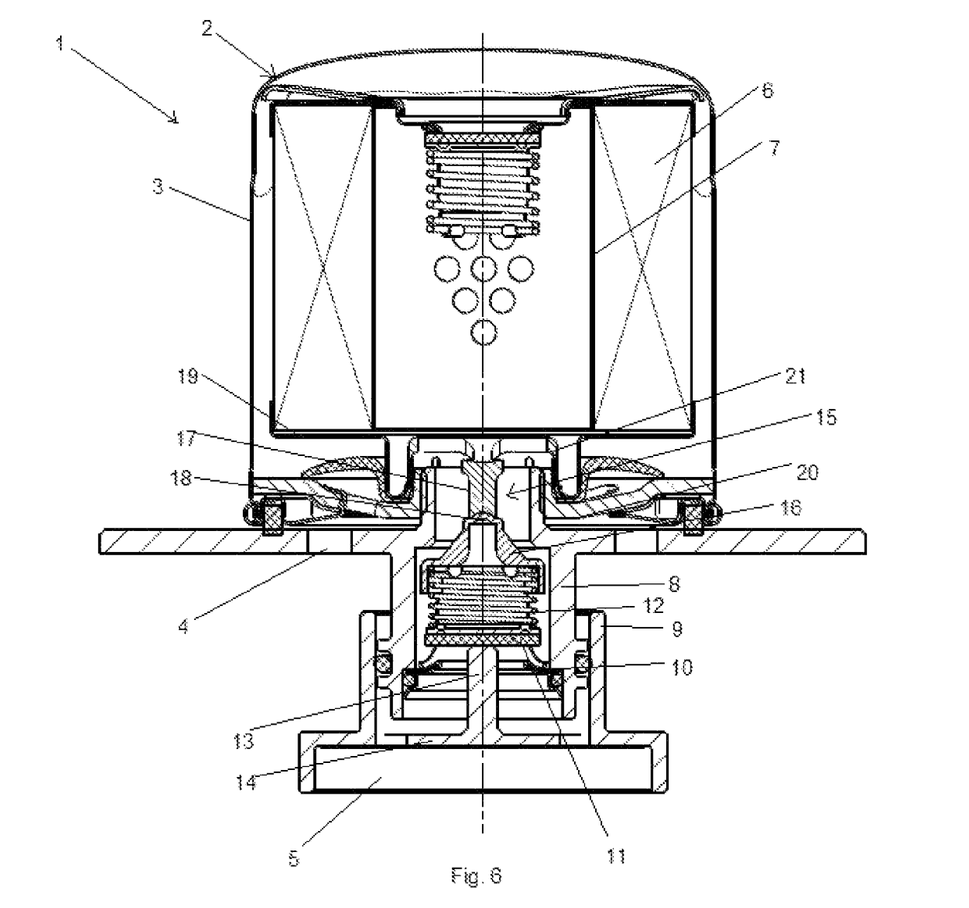
FIG. 6 shows yet another embodiment of the exchangeable filter system according to the invention.

FIG. 5 shows that the pretensioning element 15 is embodied at a threaded cover 20 of the exchangeable filter module 2. It can be either embodied as one piece together with the latter or it can be attached to it.

Finally, FIG. 6 shows that the pretensioning element 15 is attached to a seal holding ring 21. It can also be embodied as one piece together with it.

What is claimed is:

1. An exchangeable filter system comprising:
an exchangeable filter module comprising
at least one fluid inlet,
at least one fluid outlet, and
a fluid path connecting the at least one fluid inlet and the at least one fluid outlet with each other,
wherein the exchangeable filter module further comprises
at least one filter element configured to filter a fluid, the at least one filter element having a hollow interior extending from a first axial end to an opposite second axial end of the at least one filter element;
a flange element;
a counter flange element;
wherein the flange element is configured to releasably engage the exchangeable filter module and to releasably engage the counter flange element;
a valve device arranged in the flange element,
wherein the valve device is configured to block the fluid path when the flange element is in engagement with the exchangeable filter module and is disengaged from the counter flange element;
the exchangeable filter module further comprising:
a pretensioning device comprising a pretensioning element and
a counter pretensioning element,
wherein the pretensioning device is interacting with the valve device,
wherein the pretensioning element is in engagement with the counter pretensioning element when the exchangeable filter module is in engagement with the flange element;
wherein the valve device comprises:
a valve element; and
a spring element;
wherein the counter pretensioning element is attached to the spring element,
wherein the valve element, when the pretensioning element is in engagement with the counter pretensioning element, is pretensioned by the spring element against a valve seat of the valve device.

2. The exchangeable filter system according to claim 1, wherein
the filter element comprises an end disc,
wherein the pretensioning element is embodied as one piece together with the end disc of the filter element or is attached to the end disc of the filter element.

3. The exchangeable filter system according to claim 1, wherein
the pretensioning element comprises an axial projection extending in an axial direction of the exchangeable filter module, wherein the counter pretensioning element comprises an annular centering counter contour configured to receive the axial projection of the pretensioning element, wherein the axial projection of the pretensioning element, when the pretensioning element is in engagement with the counter pretensioning element, is in engagement with the annular centering counter contour of the counter pretensioning element.

4. The exchangeable filter system according to claim 1, wherein the counter flange element comprises an actuating element, wherein, when the flange element is in engagement with the counter flange element, the actuating element interacts with the valve device such that the actuating element exerts a force on the valve device that is greater than a pretensioning force of the pretensioning device.

5. The exchangeable filter system according to claim 4, wherein the pretensioning element, the counter pretensioning element, and the actuating element are arranged in the fluid path at a side of the fluid path facing the fluid outlet, wherein the pretensioning element, the counter pretensioning element, and the actuating element leave open the fluid path at least partially.

6. An internal combustion engine comprising an exchangeable filter system according to claim 1, wherein the exchangeable filter system is configured to filter fuel, lubricant or urea used in the internal combustion engine.

* * * * *